United States Patent
Pond et al.

(10) Patent No.: US 6,601,923 B2
(45) Date of Patent: Aug. 5, 2003

(54) EMERGENCY VEHICLE SEAT WITH INTEGRATED SEAT BELT

(75) Inventors: George Pond, Wisconsin Dells, WI (US); Doug Hahn, La Valle, WI (US)

(73) Assignee: Seats Incorporated, Reedsburg, WI (US)

(*) Notice: Subject to any disclaimer, the term of this patent is extended or adjusted under 35 U.S.C. 154(b) by 0 days.

(21) Appl. No.: 09/938,213

(22) Filed: Aug. 23, 2001

(65) Prior Publication Data

US 2003/0038525 A1 Feb. 27, 2003

(51) Int. Cl.[7] .............................................. B60R 22/00
(52) U.S. Cl. .................. 297/484; 297/483; 297/188.04; 297/335
(58) Field of Search ....................... 297/452.29, 188.04, 297/217.1, 483, 335, 484

(56) References Cited

U.S. PATENT DOCUMENTS

| | | |
|---|---|---|
| 3,204,775 A | 9/1965 | Smith et al. |
| 3,667,714 A | 6/1972 | Ziaylek, Jr. |
| 3,823,907 A | 7/1974 | Ziaylek, Jr. |
| 5,213,392 A | 5/1993 | Bostrom et al. |
| 5,275,462 A | 1/1994 | Pond et al. |
| 5,671,948 A * | 9/1997 | Susko et al. ............. 280/801.1 |
| 5,681,080 A | 10/1997 | Pond et al. |
| 5,730,499 A * | 3/1998 | Salisbury, Jr. .............. 280/808 |
| 5,823,627 A * | 10/1998 | Viano et al. ................ 280/805 |
| 6,045,186 A * | 4/2000 | Butt et al. .................. 297/296 |
| 6,139,111 A * | 10/2000 | Pywell et al. .......... 297/216.13 |
| 6,179,362 B1 * | 1/2001 | Wisniewski et al. ..... 296/65.01 |

FOREIGN PATENT DOCUMENTS

JP         5-112204         * 5/1993

OTHER PUBLICATIONS

H.O. Bostrom Seat; publicly disclosed at least as early as Aug. 24, 2000; various views (6 pages).
Automobile Seat #1 with Seat Belt; publicly disclosed prior to Aug. 23, 2000.
Automobile Seat #2 with Seat Belt (2 pages); publicly disclosed prior to Aug. 23, 2000.

* cited by examiner

Primary Examiner—Peter M. Cuomo
Assistant Examiner—Stephen D'Adamo
(74) Attorney, Agent, or Firm—Michael Best & Friedrich LLP (57) ABSTRACT

A seat includes a frame, an assembly for supporting a self-contained breathing apparatus, and a headrest frame. The self-contained breathing apparatus and headrest frame are mounted to the frame. The seat also includes a seat belt assembly. The seat belt assembly includes a bracket, first and second guide members, a seat belt, a seat belt reel, and first and second portions of a buckle. The bracket is mounted to the headrest frame and the first guide member is mounted to the bracket. The second guide member, seat belt reel, and second portion of the buckle are mounted to the frame. The seat belt has a first end spooled into the seat belt reel. The seat belt extends up from the seat belt reel and is then threaded through the first and second guide members and the first buckle member. A second end of the belt is mounted to the frame. The first portion of the buckle is slidably mounted to the seat belt.

19 Claims, 5 Drawing Sheets

EMERGENCY VEHICLE SEAT WITH INTEGRATED SEAT BELT

BACKGROUND

The invention relates generally to vehicle seats and, more particularly, to vehicle seats of the type for use in emergency vehicles and for supporting a self-contained breathing apparatus (SCBA). Typical seats of this type are disclosed in U.S. Pat. Nos. 3,204,775; 3,667,714; 3,823,907; 5,213,392; 5,275,462; and 5,681,080.

SUMMARY

A seat for use in an emergency vehicle is provided that includes a base portion and a seat back extending up from the base portion. The seat back includes a pair of vertical cushions spaced apart and positioned on opposite sides of a central recess. Positioned within the recess is a support assembly for supporting a self-contained breathing apparatus (SCBA). A seat belt assembly is mounted to the seat back and the base portion.

The seat belt assembly includes a bracket, first and second guide members, and a seat belt. The bracket is mounted to the seat back and the first guide member is mounted to the bracket. The second guide member is mounted to the top of the seat back. The seat belt extends through the first and second guide members and is mounted to the base portion of the seat. The first guide member guides the seat belt away from the seat back, and the second guide member guides the seat belt over the seat occupant's shoulder. In the preferred embodiment, the first guide member is a D-loop. The bracket has a curved plate with two mounting positions for the D-loop. The D-loop guides the seat belt between the headrest and the vertical cushion on the seat back, and permits proper seat belt alignment across the user's torso. The second guide member is a basic running loop that decreases friction between the seat belt and seat back. The seat belt assembly may be mounted to either side of the seat, and the D-loop is mounted to one of the mounting positions on the bracket depending on which side of the seat the seat belt assembly is mounted.

The seat belt assembly also includes a seat belt reel and first and second portions of a buckle. The seat belt reel is mounted to the first side of the seat for spooling a first end of the belt and providing a locking action when a vehicle, in which the seat is installed, comes to a sudden stop. The belt is then guided through the first and second guide members and the first portion of the buckle. The belt terminates in a small bracket with a single aperture for mounting the belt to the first side of the base.

The second portion of the buckle is anchored to the opposite side of the seat, referred to as the second side of the seat. The first and second portions of the buckle lock together when the first portion of the seat belt extends across the seat and interconnects with the second portion of the buckle, therefore restraining the seat occupant in the seat.

All the components of the seat belt assembly have the ability to switch from their previously mentioned sides, to the opposite sides of the seat. This gives the seat belt assembly the flexibility to be mounted on either side of the seat, creating an option of crossing the belt to the right or the left.

BREIF DESCRIPTION OF THE DRAWINGS

FIG. 9 is a left elevation view of a portion of the seat frame of the seat.

DETAILED DESCRITION

Figure 1:
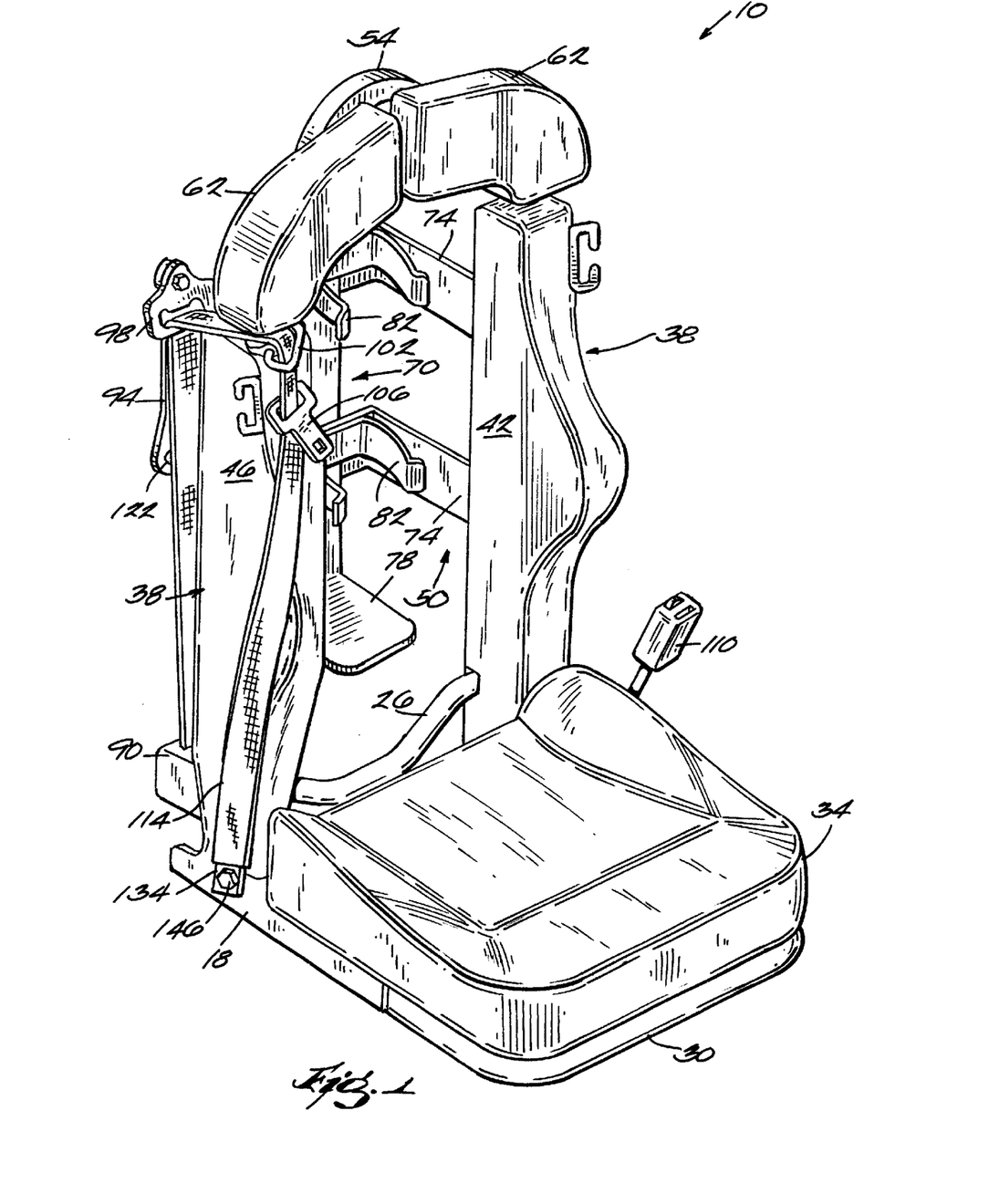
FIG. 1 is a front perspective view of a seat embodying the invention.
Figures 2, 3:
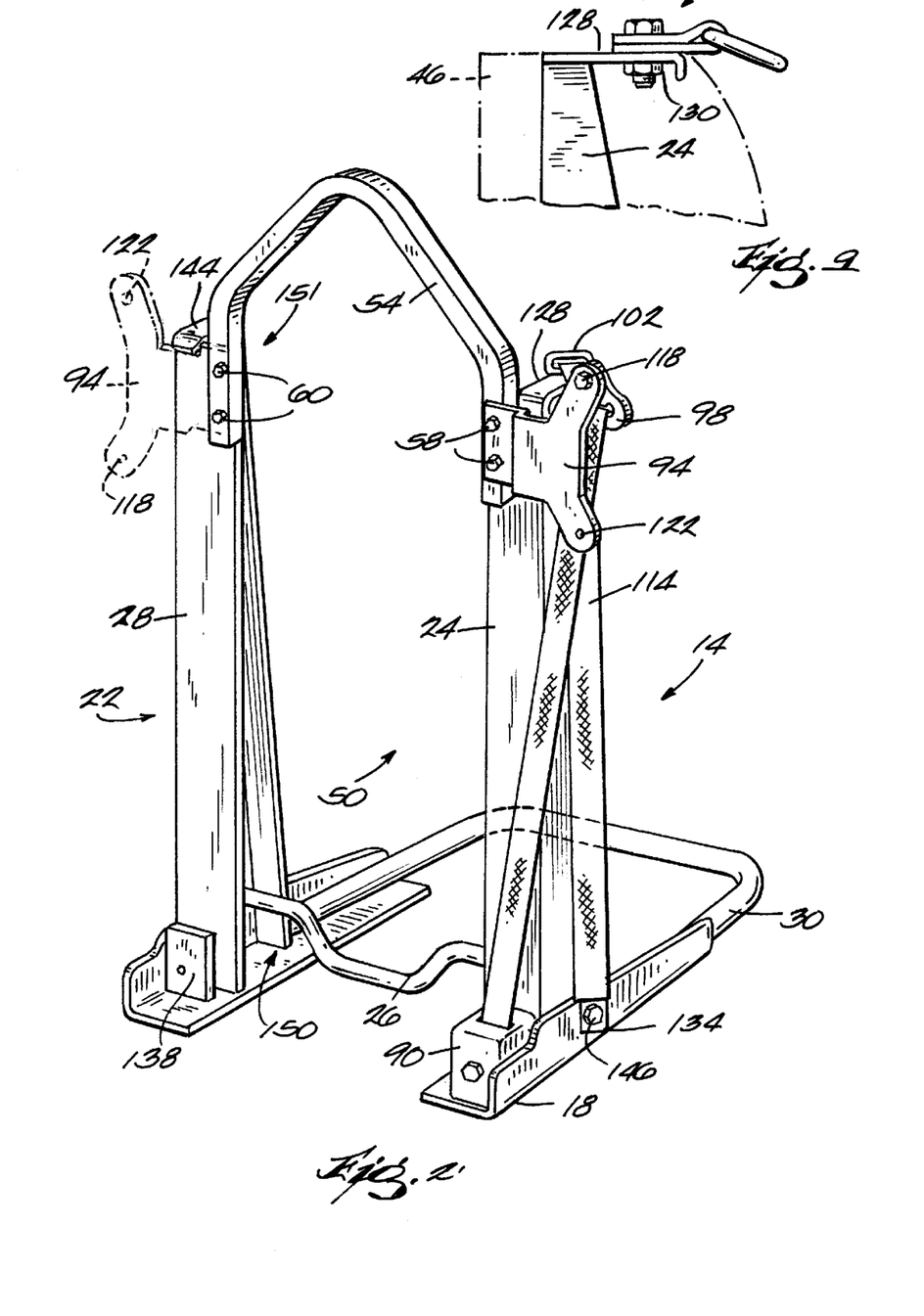
FIG. 2 is a rear perspective view of a seat frame of the seat.
FIG. 3 is a front elevation view of the seat.
Figure 3:
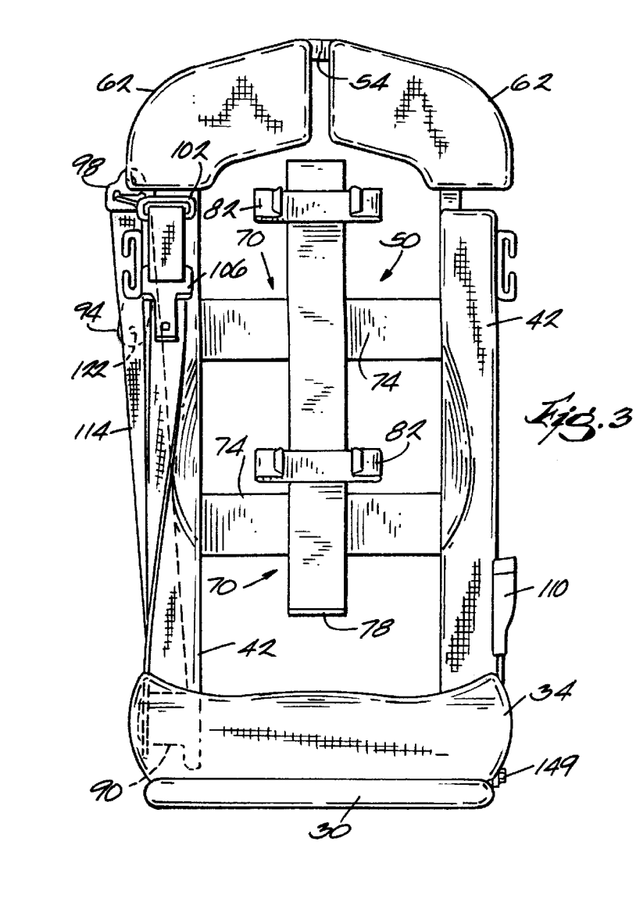

FIGS. 1 and 2 illustrate a seat 10 including a seat frame 14 having a generally horizontal portion 18 and a generally upright portion 22. The upright portion 22 of the seat frame 14 includes first and second sides 24, 28. A cross-member 26 runs between the first and second sides 24, 28 of the upright portion 22 to provide the seat frame 14 with extra stability. A base portion 30 having a seat cushion 34 is interconnected with the horizontal portion 18 of the seat frame 14, and a seat back 38 is attached to the upright portion 22 of the seat frame 14. The seat back 38 includes first and second spaced-apart vertical cushions 42, 46 mounted to the respective first and second sides 24, 28, and disposed on opposite sides of a recess 50.

A headrest frame 54 is interconnected with the upright portion 22 of the seat frame 14 by fasteners 58, 60, and extends upwardly therefrom. A pair of headrest members 62 are pivotally attached to the headrest frame 54 by hinges 66 (FIG. 4).

Figure 4:
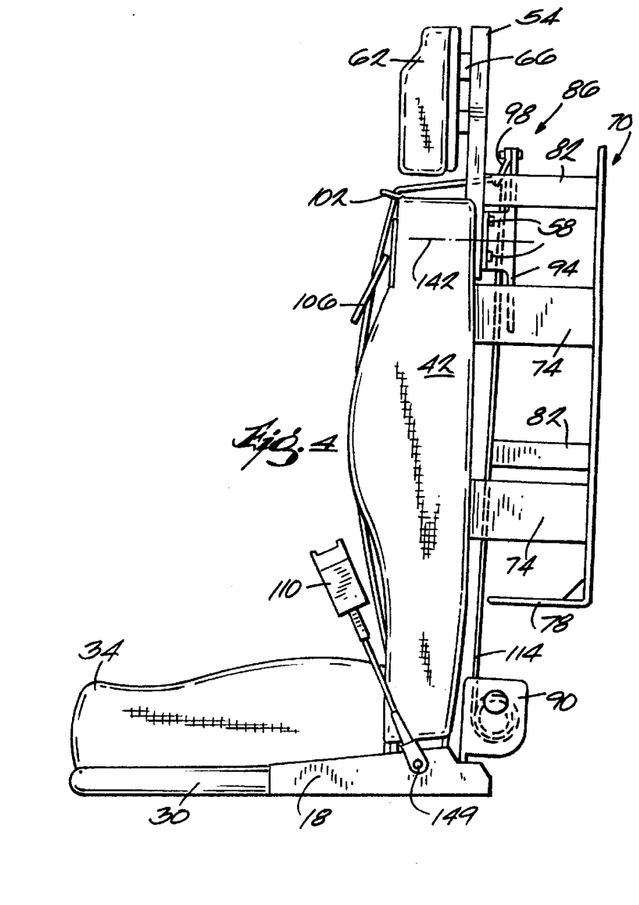
FIG. 4 is a right elevation view of the seat.
Figure 5:
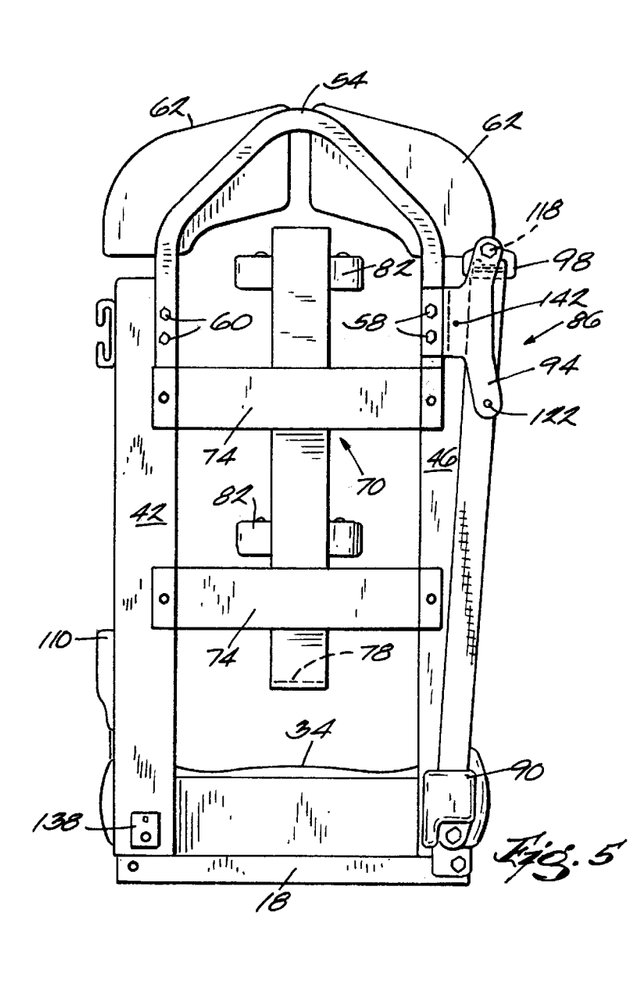
FIG. 5 is a rear elevation view of the seat.
Figure 6:
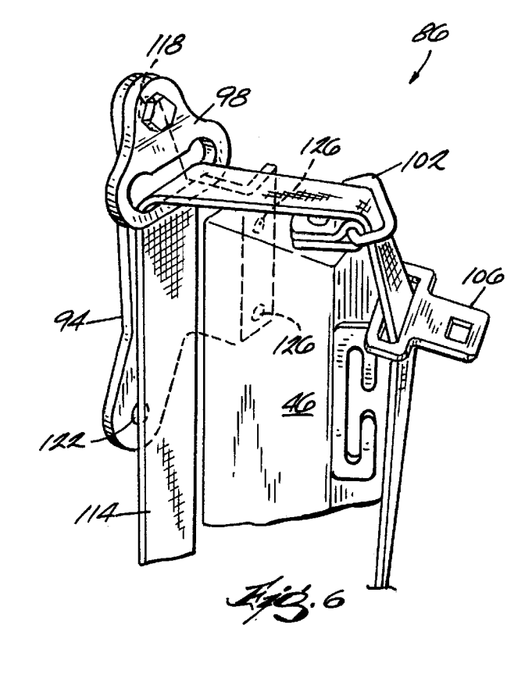
FIG. 6 is a perspective view of a portion of the seat belt assembly.

Referring now to FIGS. 3 and 4, a support assembly 70 is disposed within the recess 50 for supporting an oxygen tank (not shown), which is a part of a self-contained breathing apparatus (SCBA). The support assembly 70 includes two generally horizontally disposed support brackets 74 attached to the upright portion 22 of the seat frame 14. An L-shaped piece 78 is fastened or otherwise interconnected with the brackets 74, and includes a generally horizontal portion to support the oxygen tank. Two restraining arms 82 are rigidly attached to the L-shaped piece 78 for resiliently engaging the oxygen tank.

Referring now to FIGS. 4–7, a seat belt assembly 86 is mounted to the seat frame 14. The seat belt assembly 86 includes a seat belt reel 90, a bracket 94, first and second guide members 98, 102, a first buckle member 106, a second buckle member 110, and a belt 114. In the preferred embodiment, the seat belt reel 90 is mounted on the rear of the first side 24 of the upright portion 22 of the seat frame 14, but it may alternatively be mounted to other portions of the seat frame 14. The belt 114 has a first end spooled into the seat belt reel 90. The seat belt 114 extends up from the reel 90 and is then threaded through the first and second guide members 98, 102 and the first buckle member 106. The second end of the belt 114 is mounted to the horizontal portion 18 of the seat frame 14 with an anchor 134 and bolt 146 (FIGS. 1 and 2). In an alternative construction, the second end of the belt 114 may be mounted to a floor and/or a wall of a vehicle in which the seat 10 is mounted. The seat belt reel 90 also contains a braking mechanism (not shown) that prevents the seat belt 114 from rapidly exiting the seat belt reel 90, as would typically happen when the vehicle in which the seat is installed comes to a sudden stop. The seat belt reel 90 further includes an automatic retrieval mechanism (not shown) that automatically retrieves the belt 114 into the reel 90 when the belt is not in use. In the illustrated construction, the belt 114 extends over the right shoulder of the occupant. The occupant may grasp the first buckle member 106, pull the belt 114 across the occupant's body, and secure the first buckle member 106 to the second buckle member 110.

Figure 7:
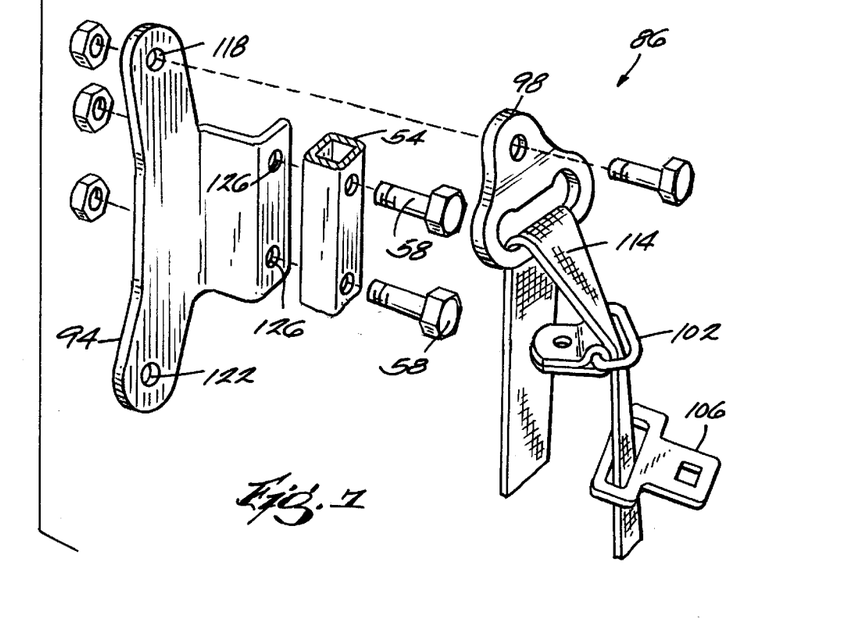
FIG. 7 is an exploded perspective view of a portion of the seat belt assembly.

The bracket 94 includes first and second mounting holes 118, 122 for supporting the first guide member 98, which is illustrated as a D-loop, but may alternatively be substantially any suitable guide member. A portion of the bracket 94 and first guide member 98 are located above the seat back 38, such that a portion of the belt 114 is guided above the seat back 38. The bracket 94 also includes two holes 126 for mounting it to the headrest frame 54 by fasteners 58. The fasteners 58 also mount the headrest frame 54 to the seat frame 14, as discussed above.

The second guide member 102, which is illustrated as a running loop, but may alternatively be substantially any suitable guide member, is mounted to a cantilevered portion 128 (FIG. 9) mounted to the top of the first side 24 of the upright portion 22 of the seat frame 14. A nut 130 is welded or otherwise affixed to the cantilevered portion 128 to provide a threaded mount for the second guide member 102. The second guide member 102 serves two purposes in the seat belt assembly 86. First, the second guide member 102 generally decreases the friction between the belt 114 and the top of the seat back 38, which reduces the likelihood of damaging the upholstery of the seat 10 or the creation of a weak spot in the seat belt 114. The reduction of friction also makes the retrieval of the belt 114 more responsive upon unlatching. Secondly, the second guide member 102 diverts the belt 114 generally away from the occupant's neck to reduce discomfort while the belt 114 is extended across the seat 10.

The first buckle member 106 is carried by and can be slid along the belt 114, and the second buckle member 110 is mounted to the horizontal portion 18 of the seat frame 14. In an alternative construction, the second buckle member 110 can also be mounted to a floor or a wall of a vehicle and still achieve the desired effect. In the preferred construction, the first buckle member 106 is a male portion and the second buckle member 110 is a female portion. However, in alternative constructions the female portion can be carried by the belt 114 and the male portion can be mounted to the horizontal portion 18 of the seat frame 14.

The seat belt assembly 86 can be switched to the other side of the seat 10 such that the belt 114 extends over the left shoulder of the occupant. More specifically, the seat belt reel 90 is mounted to a seat belt reel mount 138 on the second side 28 of the upright portion 22 of the seat frame 14. The bracket 94 is also mounted to the second side 28 of the upright portion 22 by fasteners 60 as shown in phantom in FIG. 2. For the bracket 94 to mount to the other side of the headrest frame 54, the bracket 94 is rotated 180° about a horizontal axis 142 (FIGS. 4 and 5), such that the second hole 122 is on top. The first guide member 98 may then be mounted to the second mounting hole 122. In this construction, the second guide member 102 is mounted to a cantilevered portion 144 (FIG. 2) mounted to the top of the second side 28 of the upright portion 22 of the seat frame 14. The cantilevered portions 128, 144 are substantially identical to each other. The second buckle member 110 and the second end of the seat belt 114 are mounted to sides of the horizontal portion 18 of the seat frame 14, opposite to the ones illustrated. The second buckle member 110 is mounted by a bolt 146 on one side of the horizontal portion 18, and the second end of the seat belt 114 and anchor 134 are mounted by a bolt 149 to the other side of the horizontal portion. In short, the seat belt assembly 86 may be mounted to the seat 10 in an arrangement of parts that is a mirror image of that illustrated. In an alternative to this construction, the second buckle member 110 and the second end of the belt 114 can be mounted to a floor and/or a wall of a vehicle in which the seat 10 is mounted in and still achieve the desired effect.

Referring back to FIG. 2, the upright portion 22 of the seat frame 14 has a relatively wide bottom portion 150 that connects with the horizontal portion 18 of the seat frame 14, and a relatively narrow top portion 151. The upright portion 22 therefore gradually tapers from the bottom portion 150 to the top portion 151. The wide base portion 150 provides extra strength to the seat 10 to resist bending moments on the seat frame 14 at the connection between the upright portion 22 and the horizontal portion 18 caused by forces applied to the top of the seat frame 14 through the seat belt 114. These bending moments are present whether the end of the belt 114 and the first and second buckle members 106, 110 are anchored to the seat frame 14 or the floor. Since the greatest bending moments occur on the bottom portion 150, the top portion 151 may be made narrower to reduce the weight of the seat 10.

Figure 8:
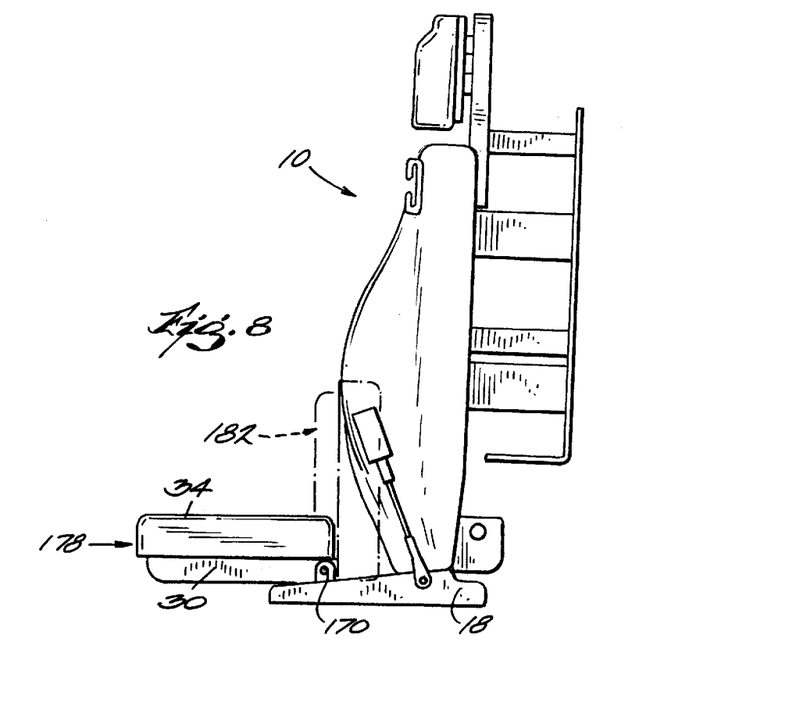
FIG. 8 is a right elevation view of an alternative construction of the seat.

Referring to FIG. 8, an alternative construction of the seat 10 is illustrated. Parts that are substantially the same as those of FIGS. 1–7 are given the same reference numbers. In this construction, the base portion 30 is pivotally connected to the horizontal portion 18 at pivot 170. The seat cushion 34 is mounted on the top of the base portion 30. The seat cushion 34 is illustrated in an unfolded position 178 in solid lines, and in a folded position 182 in phantom. When in the folded position 182, the seat 10 provides a wider walkway in front of the seat 10. The seat belt assembly 86 for this construction is substantially identical to that in FIGS. 1–7 and can be switched from side to side as discussed above.

Although particular constructions of the present invention have been shown and described, other alternative constructions will be apparent to those skilled in the art and are within the intended scope of the present invention. Thus, the present invention is to be limited only by the following claims.

What is claimed is:

1. A seat for use in an emergency vehicle, the seat comprising:
    a seat frame including a generally horizontal portion and a generally upright portion, said horizontal and upright portions together defining first and second sides of the seat, said upright portion extending up from said horizontal portion, said upright portion including a central recess between said first and second sides;
    a support assembly housed within said recess for supporting a self-contained breathing apparatus tank in the central recess;
    a seat belt having an end mounted to and carried by said first side of said seat frame; and
    first and second guide members both, being mounted to and located at the top of said seat frame, said belt extending through said first and second guide members.

2. The seat of claim 1, further comprising a buckle having a first part carried by said belt and a second part mounted to said second side of said seat frame, such that said belt is extendable across said seat and interconnectable with said second part of said buckle.

3. The seat of claim 2, wherein said seat belt is removable from said first side and is mountable to said second side of said seat, wherein said second part of said buckle is removable from said second side and is mountable to said first side of said seat, and wherein said belt is extendable across said seat and interconnectable with said second part of said buckle.

4. The seat of claim 1, further comprising a seat belt reel mounted to at least one of said upright portion and horizontal portion of said seat frame.

5. The seat of claim 4, wherein said seat belt reel is selectively mounted to either one of said first and second sides of said seat frame.

6. The seat of claim 1, further comprising a base portion pivotally connected to said horizontal portion of said seat frame, such that said base portion is pivotal between a generally horizontal operable position and a generally non-horizontal storage position.

7. A seat for use in an emergency vehicle, the seat comprising:
- a seat frame including a generally horizontal portion and a generally upright portion, said horizontal and upright portions together defining first and second sides of said seat frame, said upright portion extending up from said horizontal portion and including a central recess between said first and second sides;
- a support assembly mounted to said seat frame and adapted to support a self-contained breathing apparatus tank in alignment with said central recess such that the tank is accessible through said central recess;
- a seat belt having an end mounted to said first side of said seat frame, but capable of mounting to said second side of said seat frame;
- first and second bracket mounting structures on said first and second sides of said seat frame, respectively;
- a bracket removably mounted to said first bracket mounting structure, said bracket including a first mounting hole and a second mounting hole, said first mounting hole being positioned above said second mounting hole when said bracket is mounted to said first bracket mounting structure; and
- a guide member mounted to said bracket, said belt extending through said guide member;
- wherein said bracket is mountable to said second bracket mounting structure to position said guide member to receive said seat belt if said seat belt end is mounted to said second side, said second mounting hole being positioned above said first mounting hole when said bracket is mounted to said second bracket mounting structure.

8. The seat of claim 7, wherein
the guide member is mountable to the first mounting hole when the bracket is mounted to the first bracket mounting structure and is mountable to the second mounting hole when the bracket is mounted to the second bracket mounting structure.

9. The seat of claim 7, wherein the guide member is a first guide member, the seat further comprising a second guide member being mounted to said seat frame, said belt extending through said second guide member.

10. The seat of claim 9, wherein said second guide member is selectively mountable to said seat frame on either of said first and second sides.

11. The seat of claim 7, further comprising a buckle having a first part and a second part that are selectively coupled and uncoupled, said first part carried by said belt and said second part selectively mounted to the one of said first and second sides of said seat frame opposite the side to which said seat belt end is mounted, such that said belt is extendable across said seat and releasably interconnectable with said second side of said frame by coupling said first and second parts of said buckle.

12. A seat for use in an emergency vehicle, the seat comprising:
- a seat frame including a generally horizontal portion and a generally upright portion, said horizontal and upright portions together defining first and second sides of said seat, said upright portion extending up from said horizontal portion, said upright portion including a central recess between said first and second sides;
- a support assembly mounted to said seat frame and adapted to support a self-contained breathing apparatus tank in alignment with said central recess such that the tank is accessible through said central recess;
- a seat belt having an end mounted to and carried by said first side of said seat frame;
- a buckle having a first part carried by said belt and a second part mounted to and carried by said second side of said seat frame, such that said belt is extendable across said seat and interconnectable with said second part of said buckle;
- a bracket mounted to said first side of said seat frame;
- a first guide member mounted to said bracket; and
- a second guide member interconnected with said seat frame;
- wherein said belt extends through said first and second guide members; and
  - wherein said seat frame includes a cantilevered portion at the ton of said upright portion, and
  - wherein said second guide member is mounted to said cantilevered portion.

13. The seat of claim 12, further comprising a cushion mounted to said upright portion of said frame, wherein said cantilevered portion supports said second guide member in a position that reduces friction between said seat belt and said cushion.

14. A seat for use in an emergency vehicle, the seat comprising:
- a seat frame including a generally horizontal portion and a generally upright portion, said horizontal and upright portions together defining first and second sides of said seat, said upright portion extending up from said horizontal portion, said upright portion including a central recess between said first and second sides;
- a support assembly housed within said recess for supporting a self-contained breathing apparatus tank in said central recess;
- a seat belt reel mounted to said seat frame;
- a seat belt wound onto said reel;
- a buckle having a first part carried by said belt and a second part mounted to said seat frame, such that said belt is extendable across said seat and interconnectable with said second part of said buckle; and
- first and second guide member both being mounted to and located at the top of said seat frame, said belt extending through said first and second guide members.

15. The seat of claim 14, further comprising first and second bracket mounting structures on said first and second sides of said frame, respectively, and a bracket having first and second mounting holes, said bracket being mountable to either of said first and second bracket mounting structures, said first mounting hole being positioned above said second mounting hole when said bracket is mounted to said first bracket mounting structure and said second mounting hole being positioned above said first mounting hole when said bracket is mounted to said second bracket mounting structure.

16. The seat of claim 15, wherein said first guide member is mounted to said first mounting hole when said bracket is mounted to said first bracket mounting structure and said first guide member is mounted to said second mounting hole when said bracket is mounted to said second bracket mounting structure, and wherein said second guide member is selectively mountable to said seat frame on either of said first and second sides.

17. The seat of claim 14, further comprising a reel mounting structure on each of said first and second sides of said seat frame such that said seat belt reel may be selectively mounted to either one of said first and second sides of said seat frame.

18. The seat of claim 14, wherein said seatbelt has an end mountable to either side of said seat frame and said second part of said buckle is mountable to either side of said seat frame opposite to the side that said seat belt end is mounted.

19. The seat of claim 14, further comprising a base portion pivotally connected to said horizontal portion of said seat frame, such that said base portion is pivotal between a generally horizontal operable position and a generally non-horizontal storage position.

* * * * *

UNITED STATES PATENT AND TRADEMARK OFFICE
CERTIFICATE OF CORRECTION

PATENT NO.    : 6,601,923 B2
DATED         : August 5, 2003
INVENTOR(S)   : George Pond and Doug Hahn It is certified that error appears in the above-identified patent and that said Letters Patent is hereby corrected as shown below:

<u>Column 4,</u>
Line 60, delete ",".

<u>Column 6,</u>
Line 36, delete "ton" insert -- top --.

<u>Column 8,</u>
Line 6, put a space in-between seatbelt "seat belt".

Signed and Sealed this

Seventeenth Day of February, 2004

JON W. DUDAS
*Acting Director of the United States Patent and Trademark Office*